Jan. 12, 1965 B. REARK 3,164,874
CONCRETE PIPE WITH PRETENSIONED REENFORCEMENT
Filed Aug. 6, 1958 2 Sheets-Sheet 1

Inventor:
Benson Reark
By Graf, Nieman & Burmeister
Attorneys

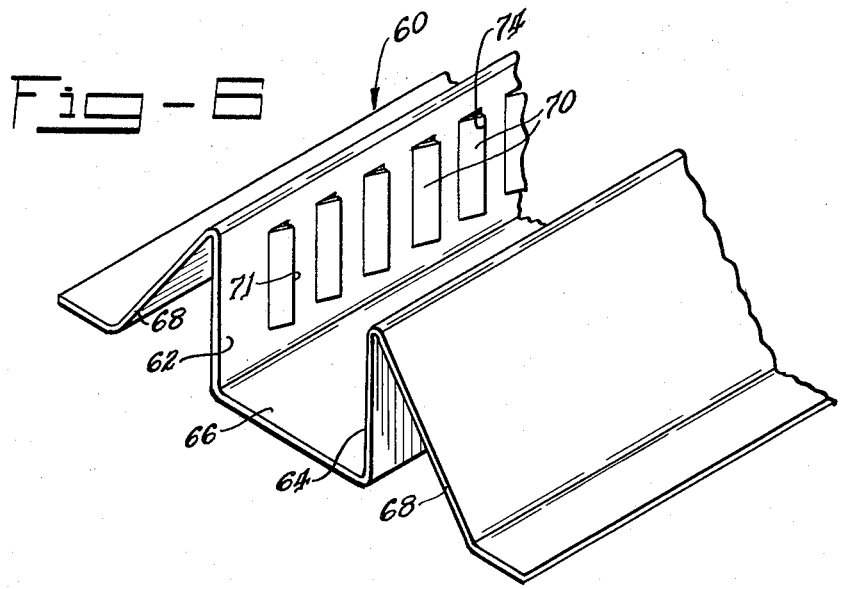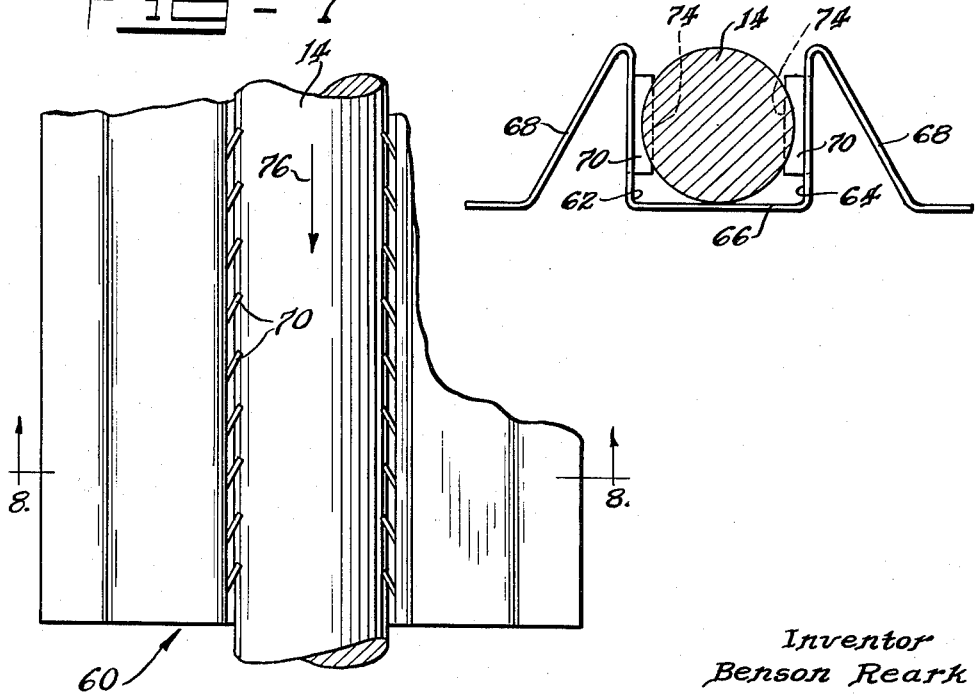

Patented Jan. 12, 1965

3,164,874
CONCRETE PIPE WITH PRETENSIONED
REENFORCEMENT
Benson Reark, 136 S. McGee St., Dayton 3, Ohio
Filed Aug. 6, 1958, Ser. No. 753,498
3 Claims. (Cl. 24—129)

The present invention relates generally to prestressed concrete pipe, and more particularly to devices for anchoring the stressing cable to the pipe.

When concrete pipe is used as a conduit for fluids under pressure, it is necessary to place the concrete in compression prior to the application of the internal pressure. One means of accomplishing this is to wrap the concrete pipe with a helical coil and secure the ends of the coil to the pipe so that the coil may be maintained under tension. When internal pressure is applied to the pipe, the resulting radial forces must overcome the compression which has been induced into the concrete to bring the concrete to a state of zero compression before the concrete can be expected to fail in tension as it would in an ordinary pipe.

In one type of concrete pipe, a thin cylinder, generally of sheet metal, is employed and the interior surface of the sheet metal is coated with a layer of concrete. The stressing cables are wound under tension about the exterior surface of the cylinder after the concrete layer has cured. A layer of concrete is then placed on the exterior surface of the cylinder covering the tensioning cables, and this layer is cured to complete the production process.

Difficulty has been experienced in anchoring the ends of the tensioning cable to the cylinder. Since the tensioning cables must not stretch, it is conventional to use a concrete reenforcing wire, generally of steel containing a relatively large manganese content. Such wire cannot be directly welded to the cylinder because the welding heat would break down the tensile properties of the wire or cable. The conventional manner of attaching the tensioning cable to the cylinder is to place a sleeve lined with a "carborundum" composition about the end of the tensioning cable and weld the sleeve to the cylinder. The sleeve is first compressed over the end of the tensioning cable, and the "carborundum" composition forced into the surface of the wire. The abrasive action of the "carborundum" composition secures the tensioning cable to the sleeve, and the sleeve may then be arc welded to the cylinder. This conventional process has the disadvantage of delaying production twice for each pipe, once for securing each end of the tensioning cable to the cylinder. Further, the sleeves employed in making the attachment are costly, and they must be carefully compressed about the end of the tensioning cable to assure maintenance of tension during the life of the pipe.

It is one of the objects of the present invention to provide a prestressed concrete pipe with an improved means for anchoring the ends of the tensioning cable to the pipe.

It is a further object of the present invention to provide a prestressed concrete pipe of lower cost than has heretofore been available.

It is a further object of the present invention to provide an improved anchoring device for cables under tension, particularly tensioning cables for use in prestressing concrete.

These and further objects of the present invention will be more fully appreciated from a further consideration of this disclosure, particularly when read in the light of the drawings, in which:

FIGURE 6 is an isometric view of another anchoring device which constitutes an embodiment of the present invention;

FIGURE 7 is a plan view of the anchoring device of FIGURE 6; and

FIGURE 8 is a sectional view taken along the line 8—8 of FIGURE 7.

Figure 1:
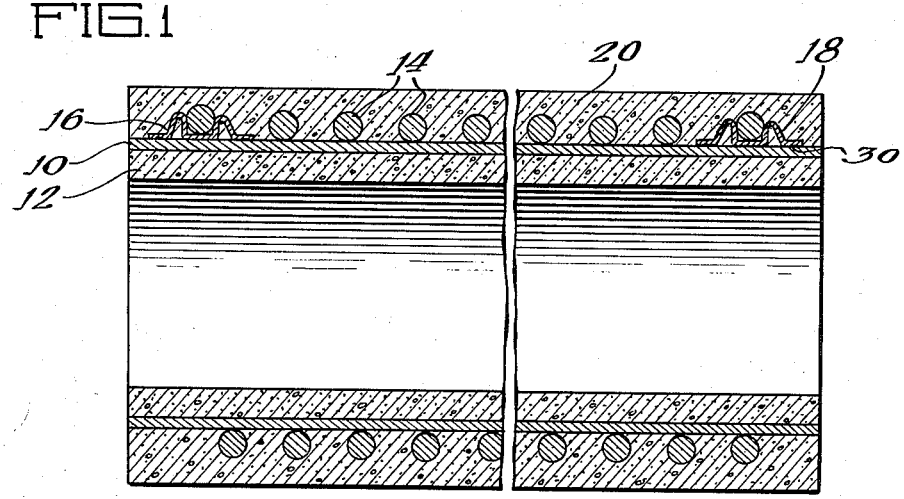
FIGURE 1 is a longitudinal sectional view of a prestressed concrete pipe constructed according to the teachings of the present invention.

In FIGURE 1, a metallic cylinder 10, preferably of sheet steel, is illustrated with a layer 12 of concrete coated on its inner surface. This may be accomplished by spinning the concrete onto this surface. A tensioning cable 14 is wrapped in a helical coil about the exterior surface of the cylinder 10, and means 16 and 18 are provided at opposite ends of the cable 14 to anchor the cable to the exterior surface of the cylinder 10. The cable 14 is constructed of material which has high tensile strength and which will not stretch under the tension applied thereto. The cable 14 is placed under a substantial tension, and in one example of the present invention this tension is 4200 pounds and the cable is No. 6 steel wire having a manganese content of 1.60 percent. Because of the high manganese content of the cable 14, it cannot be directly welded to the cylinder 10 without breaking down its tensile strength. An outer layer 20 of concrete is disposed about the tensioning cable 14 and the exterior surface of the cylinder 10 to complete the prestressed concrete pipe.

Figure 2:
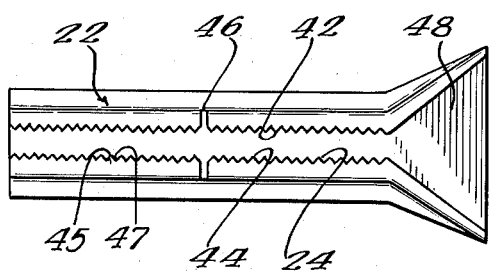
FIGURE 2 is a plan view of the device for anchoring the tensioning cables to the concrete pipe illustrated in FIGURE 1.
Figure 3:
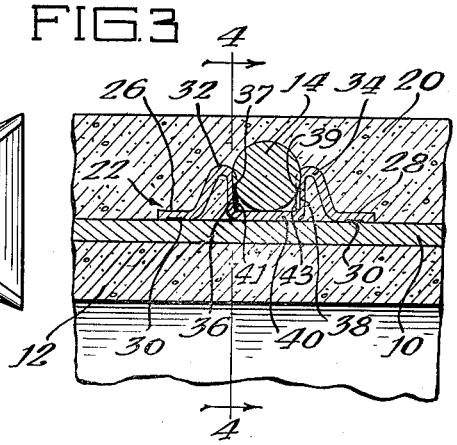
FIGURE 3 is an enlarged fragmentary sectional view of the prestressed concrete pipe of FIGURE 1 illustrating the tension cable anchoring device.
Figure 4:
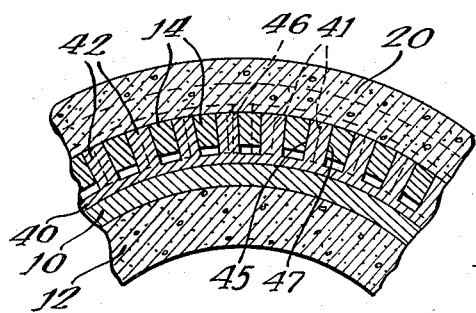
FIGURE 4 is a sectional view taken along the line 4—4 of FIGURE 3.

FIGURES 2 through 4 illustrate the details of the anchoring means 16 and 18 employed to anchor the ends of the stressing cable 14 to the cylinder 10. A channel forming means in the form of a sheet metal member 22 defines a straight channel 24 for accommodating the tensioning cable 14. The member 22 has two outwardly extending edge portions 26 and 28 which abut and are secured to the cylinder 10, for example by spot welding as indicated at 30. The member 22 curves away from the cylinder 10 adjacent to the edge portions 26 and 28, and is provided with two reverse bends 32 and 34 which form two walls 36 and 38 which are parallel to each other and the confronting surfaces 37 and 39 are spaced by a distance greater than the diameter of the stressing cable 14. The walls 36 and 38 are joined adjacent to the cylinder 10 by a portion 40, and the channel 24 is defined by the walls 36 and 38 and the portion 40. The walls 36 and 38 are normal to the surface of the cylinder and provided with confronting teeth 42 and 44, respectively, which extend from the surfaces 37 and 39 of the walls to terminate in elongated edges 41 and 43 which extend normal to the axis of the channel, and the edges 41 and 43 of confronting teeth 42 and 44 confront each other at a distance less than the diameter of the cable. Each tooth 42 or 44 is formed by two flat surfaces 45 and 47 disposed in planes at an angle to the walls 36 and 38, and the flat surfaces 45 and 47 of each tooth converge from the wall of said tooth.

As illustrated in the FIGURES 2 through 4, the teeth are arranged in pairs, one tooth 42 confronting a tooth 44. However, it is to be understood that the teeth need not directly confront each other, but that each tooth must project into the channel sufficiently that the distance from the tooth to the opposite wall of the channel is less than the diameter of the cable. Also, the material employed to construct the member 22 must be harder than the material of the tensioning cable 14. As a result of these two limitations, when the tensioning cable 14 is wedged into the channel 24, the teeth 42 and 44 drive indentations into the tensioning cable 14 and hold the cable securely to the member 22. Unless the teeth 42 and 44 either confront each other or are spaced from the opposite wall by a distance no greater than the diameter of the cable, it may be possible for the tensioning cable to bend between the teeth, rather than become indented by the teeth, and this construction tends to permit the cable to slip relative to the anchoring means.

The member 22 is made flexible enough to follow the exterior surface of the cylinder 10 as a result of one or more serrations 46 extending into the member 22 from the bends 32 and 34 to the portion 40. These serrations or cuts 46 weaken the walls 36 and 38 and portions between the bends 32 and 34 and edge portions 26 and 28 in the region of the cuts for this purpose.

One end of the member 22 is provided with an outwardly flaring portion 48 of the channel 24 to enable the tensioning cable 14 to be readily guided into the channel 24. When assembled in a prestressed concrete pipe, as illustrated in FIGURE 1, the flared portion 48 of the channel 24 occurs at the end of the member 22 opposite the end of the tensioning cable 14.

It is to be noted from FIGURES 3 and 4, that only a relatively small portion of the surface of the teeth 42 and 44 is in actual abutment with the tensioning cable 14. Also, the walls 36 and 38 are only required to extend above the axial plane of the tensioning cable 14 which is parallel to the surface of the cylinder 10 by a distance slightly greater than half of the distance of contact between the teeth 42 and 44 and the tensioning cable 14. As a result, the member 22 raises the tensioning cable 14 from the surface of the cylinder 10 by a distance only approximately equal to the thickness of the portion 40 of the member 22. It is therefore readily possible, as illustrated in FIGURE 4, to provide an outer layer 20 of concrete which completely covers the cable 14 including the portion disposed within the anchoring means 16 and 18. It is further to be noted that it is only the portions of the teeth 42 and 44 which contact the tensioning cable 14 which require accurate spacing.

In one particular construction of the present invention, the member 22 is constructed of 16 gauge sheet steel which is carbonized to provide a harder surface than the tensioning cable 14. The tensioning cable 14 is a No. 6 wire with a diameter of approximately 0.192 inch and contains steel with approximately 1.60 percent manganese. The walls 36 and 38 are spaced by a distance of approximately 0.201 inch as measured between confronting indentations between teeth 42 and 44. The teeth 42 and 44 extend inwardly a distance of 0.010 inch to confront each other at a distance of approximately 0.181 inch and are spaced on each wall 36 and 38 by a distance of 0.031 inch. The walls 36 and 38 extend a distance of 0.160 inch above the portion 40 of the member 22, and the length of contact between the teeth 42 and 44 and the tensioning cable 14 is approximately $\frac{1}{16}$ inch. Ninety-six teeth 42 and 44 are employed in this construction, and a tension of 4200 pounds is placed upon the tensioning cable 14. This construction is suitable for prestressed concrete pipe having diameters ranging from 16 to 80 inches. The length of the particular anchoring device of this construction is 3.750 inches, and the serrations 46 occur at spacings of 1.5 inches.

Figure 5:
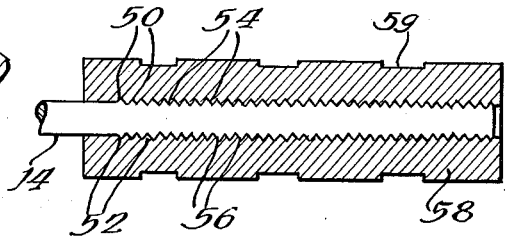
FIGURE 5 is a longitudinal sectional view of an anchoring device which constitutes another embodiment of the present invention.

FIGURE 5 illustrates another means for anchoring the stressing cables to the cylinder 10. In FIGURE 5, the end of the stressing cable 14 is provided with a plurality of outwardly extending teeth 50 and 52 which are disposed on opposite sides of the stressing cable 14. Indentations 54 are disposed between the teeth 50, and indentations 56 are disposed between the teeth 52. The teeth and indentations 50 and 54, and 52 and 56 may be formed by compressing the tensioning cable 14 between parallel ribbed surfaces.

A sleeve 58 of softer metal than the cable is disposed about the end of the tensioning cable 14 and compressed upon the teeth 50 and 52. This may be accomplished by swaging the sleeve 58, as indicated by the spiral grooves 59. It is apparent that the sleeve defines a channel for the wire in a manner similar to the member 22 of the previous embodiment. Before compressing the sleeve 58 onto the tensioning cable 14, the inner diameter of the sleeve must be greater than the maximum distance between the teeth 50 and 52. Since the sleeve may be constructed of material which can be welded, such as steel, the sleeve 58 may be directly welded to the cylinder 10 in the construction of prestressed concrete pipe.

FIGURES 6, 7, and 8 show another anchoring device suitable for anchoring the cable 14 to the cylinder 10. This device employs an elongated channel forming member 60 which is provided with a pair of parallel walls 62 and 64 which are spaced from each other by a distance slightly greater than the diameter of the cable 14. The walls 62 and 64 are joined together at one end by a strip 66, and are provided with mounting brackets 68 at the other end. The member 60 is constructed of high carbon spring steel which has been hardened and drawn. A plurality of spaced tabs 70 extend from the walls 62 and 64 toward the confronting wall. The tabs 70 are formed by perforations 71 in the wall 62 and bending the tabs 70 toward the confronting wall 62 or 64. One edge 74 of each perforation is straight and disposed normal to the strip 66, so that the tabs 70 form a row of parallel teeth which extend into the channel sufficiently far to indent the cable 14, as illustrated in FIGURES 7 and 8. The cable is placed under tension in a direction against the straight edges 74 of the tabs 70, as indicated by the arrow 76 of FIGURE 7, so that the greater the tension on the cable 14, the further the penetration of the tabs 70 into the cable 14.

In one construction of this embodiment of the invention, a No. 6 wire (diameter 0.192 inch) is retained against a force of 4000 pounds by a channel forming member 60 constructed of 0.030 inch thick steel.

Many additional constructions and embodiments of the present invention will be apparent to those skilled in the art from a reading of this disclosure. For example, the member 22 may be employed to anchor two tensioning cables together without departing from the spirit of this invention. It is also apparent, that the anchoring devices here disclosed can be used to anchor cables under tension for devices other than prestressed concrete pipe. It is therefore intended that the scope of the present invention be not limited by the foregoing disclosure, but rather only by the appended claims.

The invention claimed is:

1. A combination die and gripping device for holding a wire comprising a body of sheet metal having spaced parallel walls defining an elongated channel therein, said walls diverging from each other at one end and being fixedly interconnected at one edge by a portion extending between said walls, the edges of the walls opposite the interconnecting portion terminating in reverse bends, and said body having marginal portions in a common plane with the interconnecting portion between the walls and attached to said reverse bends, a plurality of teeth extending from each one of said walls into the channel, each set of said teeth terminating remote from its wall on substantially a plane substantially parallel to its wall in elongated edges substantially normal to the longitudinal axis of the channel, each tooth having side wall surfaces extending from its wall to the terminating plane of said tooth, said two terminating planes being spaced from each other, whereby the die and gripping device is adapted to receive a wire softer than said die and gripping device and having a diameter less than the distance between said walls and greater than the distance between said terminating planes, the wire, upon being driven into the channel being provided with teeth therein meshing with the teeth of the die and gripping device for gripping the wire.

2. A combination die and gripping device for holding a wire comprising the elements of claim 1, wherein the body is constructed of a single piece of sheet metal and the marginal portions are spaced from the walls and are of a substantial width.

3. A combination die and gripping device for holding a wire comprising the elements of claim 1, wherein each of the walls is provided with a slot disposed in a common plane normal to the axis of the channel, said slots extending through the walls and terminating adjacent to the interconnecting portion.

References Cited in the file of this patent
UNITED STATES PATENTS

| | | |
|---|---|---|
| 322,501 | Taylor | July 21, 1885 |
| 332,347 | Keelyn | Dec. 14, 1885 |
| 800,462 | Meinecke | Sept. 26, 1905 |
| 942,007 | Morrill | Nov. 30, 1909 |
| 1,505,638 | Glass | Aug. 19, 1924 |
| 1,554,890 | Sonner | Sept. 22, 1925 |
| 2,166,847 | Miller et al. | July 18, 1939 |
| 2,180,866 | Cryer | Nov. 21, 1939 |
| 2,375,921 | Hirsh | May 15, 1945 |
| 2,386,473 | Kanary | Oct. 9, 1945 |
| 2,574,107 | Joy | Nov. 6, 1951 |
| 2,827,679 | Blaton | Mar. 25, 1958 |
| 2,834,081 | Stump | May 13, 1958 |
| 2,916,785 | Daugert | Dec. 15, 1959 |

FOREIGN PATENTS

| | | |
|---|---|---|
| 935,088 | Germany | Nov. 10, 1955 |